United States Patent [19]
Igwe

[11] 3,829,141
[45] Aug. 13, 1974

[54] MOTOR VEHICLE BUMPER

[76] Inventor: Godwill M. Igwe, 180 Queen Mary Rd. Apt. 708, Kingston, Ontario, Canada

[22] Filed: Nov. 28, 1972

[21] Appl. No.: 310,125

[52] U.S. Cl.............................. 293/71 P, 267/140
[51] Int. Cl. ............................................ B60r 19/10
[58] Field of Search........ 293/1, 60, 70, 71 R, 71 P, 293/72, 88, 98; 114/219; 267/116, 140

[56] References Cited
UNITED STATES PATENTS

| | | | |
|---|---|---|---|
| 1,096,609 | 5/1914 | Dodge.................................. | 293/88 |
| 1,627,472 | 5/1927 | Watson................................ | 293/71 P |
| 3,187,710 | 6/1965 | Wilfert................................. | 293/60 |
| 3,722,876 | 3/1973 | Schwenk............................. | 293/88 |

*Primary Examiner*—M. Henson Wood, Jr.
*Assistant Examiner*—Robert Saifer
*Attorney, Agent, or Firm*—Sim & McBurney

[57] ABSTRACT

A motor vehicle bumper includes a tube containing gas under pressure mounted on a rigid support plate and a resilient elongated metal band extending in tension in contact with the outer surface of the tube.

7 Claims, 3 Drawing Figures

PATENTED AUG 13 1974   3,829,141

MOTOR VEHICLE BUMPER

This invention relates to a motor vehicle bumper, more particularly to an automobile bumper.

Motor vehicle bumpers, particularly automobile bumpers, have been constructed for many years of sheet metal. While these bumpers do afford some protection for the vehicle, upon collision impact, even at low speeds, they tend to deform readily. Replacement of the whole bumper usually is required at considerable expense.

Many minor collisions involve only a small area of the surface of the bumper. The ready deformation of sheet metal bumpers upon collision impact is due to a large degree to the localization of the impact force over a short length of the bumper.

In accordance with the present invention there is provided an automobile bumper which is inexpensive and is not deformed readily, even at high collision speeds.

There have been many prior art suggestions to provide resilient bumper assemblies, often employing rubber tubes, but none of these assemblies has been found to be entirely satisfactory.

In the present invention, the bumper assembly includes a resilient assembly including a tube which is constructed of a volumetrically compressible but substantially non-expandable material, such as fabric reinforced rubber, and is filled with a compressible fluid, typically air. The pressure of air within the tube depends to a large extent on the impact speed which the bumper is required to absorb. The tube is mounted on a rigid backing plate, typically sheet metal, which is secured to the automobile. A resilient metal band extends the length of the tube and engages the outer face. The ends of the band are mounted on the backing plate.

The band has a length slightly less than the length of the tube and hence is in tension in engagement with the tube. This arrangement prestresses the rigid backing plate and the resulting structure is resilient and automatically adjustable upon being subjected to an impact force.

Thus, upon collision impact at any area along the length of the tube, the tube and band deform inwardly at that point. This causes the remainder of the inflated tube to deform or flex outwardly slightly, thereby increasing the tension in the band. The increase in the tension in the band places tension stresses on the rigid backing plate. These effects diminish any bending tendency of the backing plate and lead to rapid adsorption of the impact force by the whole structure and resilient resumption of the original form of bumper.

Hence the force of the impact on the bumper is not localized at the impact area, but rather is distributed over the whole length of the bumper and hence is rapidly absorbed.

The invention is illustrated by the accompanying drawings, in which.

Figures 1, 2, 3:
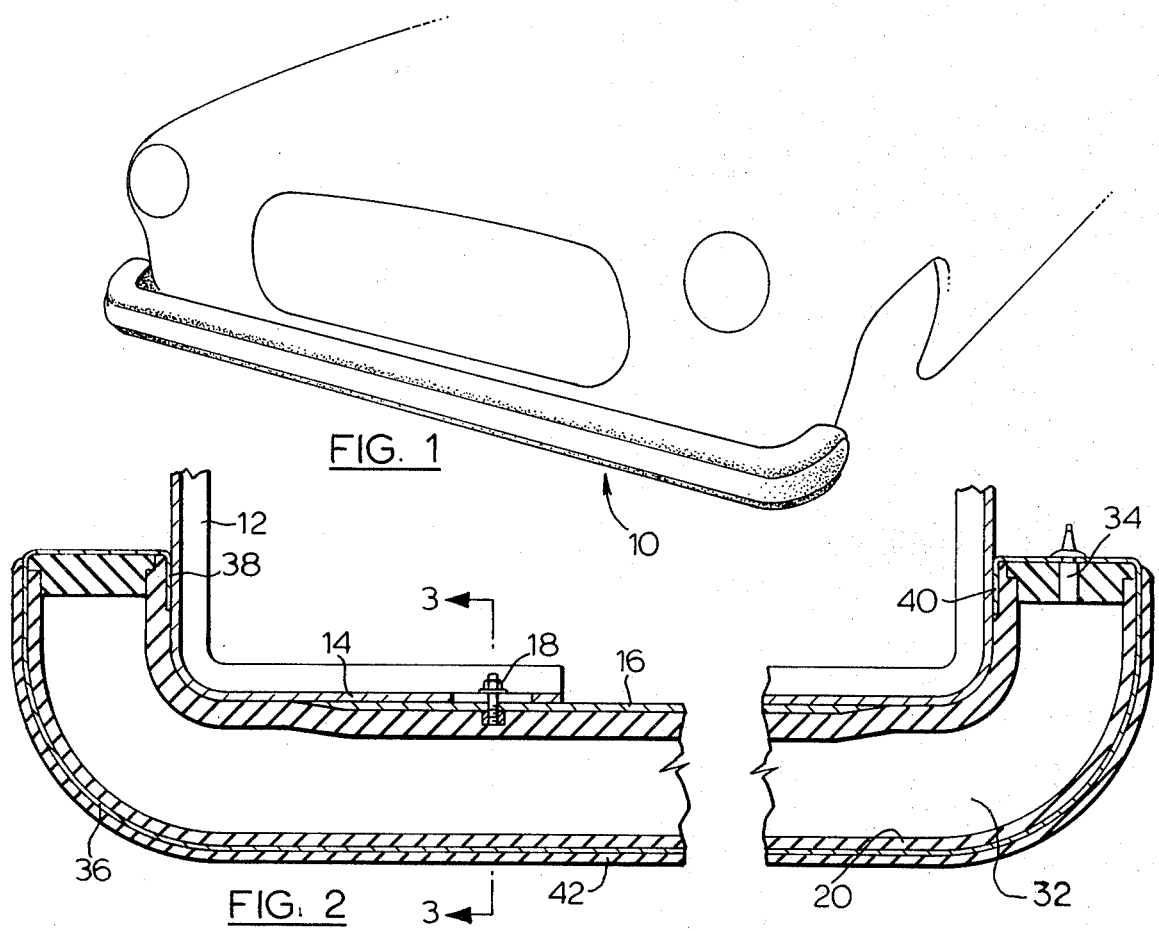
FIG. 1 is a schematic representation of an automobile having a bumper in accordance with one embodiment of the present invention attached thereto.
FIG. 2 is a cross-sectional view of the bumper shown in FIG. 1.
FIG. 3 is a cross-sectional view of the bumper of FIG. 2 taken on line 3—3.

In the drawings, an automobile bumper 10 includes a backing plate 12 of any convenient construction, typically an elongated metal flange. The backing plate 12 may have a unitary construction or may be formed of two or more portions joined one to another. As may be seen in FIG. 2, the backing plate 12 typically may include two overlapping sections 14 and 16 joined together by bolts 18.

The use of two overlapping sections allows the bumper 10 to be readily adjusted for varying widths of automobiles.

An elongated tube 20 is affixed to the backing plate 12 in any convenient manner, typically by the use of a plurality of bolts 18 embedded in recesses 22 in the surface of the tube 20 adjacent the backing plate 12.

The elongated tube 20 is constructed of volumetrically compressible but substantially non-expandable material, typically fabric-reinforced rubber, such as that used in automobile tires. Any desired cross-section may be employed, but for ease of mounting and association with the other elements of the assembly, it is preferred that the tube 20 have a rectangular cross-section, as illustrated in FIG. 3.

The tube 20 includes a first or rear wall 24 which usually is thicker than the remaining walls and engages and is secured to the backing plate 12. When the tube 20 has the cross-sectional shape illustrated in FIG. 2, preferably the backing plate 12 has a flat surface engaging the outer face of the first wall 24.

The tube 20 additionally includes a second or front wall 26 spaced from and parallel to the first wall 24 and intended to face outwardly of the vehicle on which the bumper assembly 10 is mounted. Two side walls 28 and 30 space the front wall 26 from the rear wall 24.

The hollow internal area 32 of the tube 20 is filled with a compressible fluid through a valved opening 34. The valved opening 34 may be of any convenient construction to allow the tube 20 to be filled with compressible fluid but resistant to flow of compressible fluid out of the tube 20. Typically, the compressible fluid is air and the valved opening 34 may be of the type used for automobile tires.

The compressible fluid is pumped into the tube 20 to any desired degree of compression. Generally between 60 and 100 psi internal pressure is employed. The higher the internal pressure of the tube 20 generally the greater is the impact force resistance of the bumper. Above about 100 psi, however, increases in pressure do not advantageously increase impact resistance.

While the tube 20 is illustrated as being in the form of a U-shape, this shape is adopted for ease of illustration. The tube 20 and its backing plate 12 may be of any desired shape. As will become more apparent hereinafter, the illustrated shape increases the impact resistance of the bumper assembly 10. Usually a pressure of about 70 psi is used.

The bumper assembly 10 includes a band 36 of resilient metallic material, typically spring steel, which extends the length of the tube 20. The band 36, which typically is less wide than the front wall 26 of the tube 20, has its ends 38 and 40 secured to the backing plate 12.

The band 36 engages and may be secured in any convenient manner to the outer face of the second or front wall 26 of the tube 20. The band 36 has a length slightly less than the length of the tube 20 and hence a resilient structure is provided thereby. This arrangement prestresses the backing plate 12 and provides an automatically compensating structure 10.

In view of the resilience of the bumper structure 10, upon impact of a force at some position across the width of the bumper structure 10, the structure at that point deforms inwardly causing the structure elsewhere to flex outwardly slightly. However, the nature of the materials of construction of the bumper resists such flexing and instead the structure dissipates and absorbs the force of the impact and resiliently restores the bumper to its original shape upon release of the force.

In this way a large number of collision impacts which would permanently deform sheet metal bumpers due to local absorption of impact forces, are resiliently absorbed by the bumper of the present invention due to the dissipation of the local impact force over the whole of the bumper.

The shaping of the tube 20 as a U-shape, as illustrated, tends to stretch slightly the material in the front wall 26 of the tube 20 and assists in the tensioning of the structure, and hence in its ability to absorb collision impacts.

For aesthetic purposes, an outer covering layer 42 of any convenient material may be provided to complete the structure.

Modifications are possible within the scope of the invention.

What I claim is:

1. A motor vehicle bumper structure comprising:
   a substantially rigid prestressed supporting plate for mounting said bumper on said automobile,
   an elongated hollow tube,
   mounting means mounting said tube on said supporting plate,
   said tube being filled with a compressible fluid under pressure, said tube being constructed of a volumetrically compressible and substantially non-expandable material,
   a resilient elongated metal band secured at each end thereof to said supporting plate and extending in contact with an outer surface of said tube, the portion of said tube engaged by said band constituting at least in part the impact absorbing surface of said structure,
   said band being in tension in engagement with said tube thereby prestressing said support plate.

2. The structure of claim 1 wherein said tube has a substantially rectangular cross-section.

3. The structure of claim 2 wherein said supporting plate has a flat surface on which one wall of said tube is mounted, the wall of said tube opposite said one wall being engaged by said band.

4. The structure of claim 1 including one-way valve means in fluid flow communication with the inner portion of said tube, whereby compressible fluid may be introduced to said tube.

5. The structure of claim 1 wherein said compressible fluid is air.

6. The structure of claim 1 wherein said compressible fluid is air and is under a pressure of about 60 to 100 psi.

7. The structure of claim 1 including a layer of material overlying said metal band.

* * * * *